United States Patent
Cheng

(10) Patent No.: US 9,244,833 B2
(45) Date of Patent: Jan. 26, 2016

(54) DATA-STORAGE DEVICE AND FLASH MEMORY CONTROL METHOD

(71) Applicant: Silicon Motion, Inc., Jhubei, Hsinchu County (TW)

(72) Inventor: Chang-Kai Cheng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 380 days.

(21) Appl. No.: 13/862,816

(22) Filed: Apr. 15, 2013

(65) Prior Publication Data

US 2013/0326121 A1 Dec. 5, 2013

(30) Foreign Application Priority Data

May 30, 2012 (TW) .............................. 101119266 A
Sep. 6, 2012 (TW) .............................. 101132461 A

(51) Int. Cl.
*G06F 12/00* (2006.01)
*G06F 12/02* (2006.01)

(52) U.S. Cl.
CPC .... *G06F 12/0246* (2013.01); *G06F 2212/7201* (2013.01); *G06F 2212/7207* (2013.01)

(58) Field of Classification Search
CPC ................................ G06F 12/00; G06F 3/0679
USPC ................................... 711/100, 103, 154, 200
See application file for complete search history.

(56) References Cited

U.S. PATENT DOCUMENTS

| 6,587,113 | B1* | 7/2003 | Baldwin ................. G06T 1/60 345/552 |
| 8,176,295 | B2 | 5/2012 | Mothilal |
| 2009/0100223 | A1* | 4/2009 | Murayama ........... G06F 3/0605 711/114 |
| 2009/0164733 | A1 | 6/2009 | Kim et al. |
| 2011/0258406 | A1* | 10/2011 | Suetsugu ............. G06F 3/0608 711/162 |

FOREIGN PATENT DOCUMENTS

| TW | 201113702 | 4/2011 |
| TW | 201122816 | 7/2011 |
| WO | 2011031689 A1 | 3/2011 |

OTHER PUBLICATIONS

English language translation of abstract of TW 201113702 (published Apr. 16, 2011).
English language translation of abstract of TW 201122816 (published Jul. 1, 2011).

* cited by examiner

*Primary Examiner* — Tuan Thai
(74) *Attorney, Agent, or Firm* — McClure, Qualey & Rodack, LLP

(57) ABSTRACT

FLASH memory is allocated to provide a data-storage device and management tables. The management tables may record logical-to-physical address mapping information in a hierarchical structure consisting of at least two levels. Further, in addition to the logical-to-physical address mapping information, the management tables may further provide a valid page count table and an invalid block record. The logical-to-physical address mapping information is updated after an update of the valid page count table is completed. The invalid block record is maintained based on the valid page count table.

10 Claims, 9 Drawing Sheets

DATA-STORAGE DEVICE AND FLASH MEMORY CONTROL METHOD

CROSS REFERENCE TO RELATED APPLICATIONS

This Application claims priority of Taiwan Patent Application No. 101119266, filed on May 30, 2012, and Taiwan Patent Application No. 101132461, filed on Sep. 6, 2012, the entirety of which is incorporated by reference herein.

BACKGROUND OF THE INVENTION

1. Field of the Invention

The present invention relates to a data-storage device and a FLASH memory control method.

2. Description of the Related Art

Today, FLASH memory (e.g. NAND FLASH) is commonly used in data-storage devices as a storage medium.

With the development of semiconductor process technology, the storage capacity that FLASH memory provides is quite large. Thus, the management information, such as a logical-to-physical address mapping table, about the storage space is increasingly growing and difficult to manage.

In addition to the logical-to-physical address mapping table, there are a considerable number of tables that should be maintained. The normal operation of a data-storage device depends on the accuracy of the tables.

BRIEF SUMMARY OF THE INVENTION

Data-storage devices and FLASH memory control methods are disclosed.

A data-storage device in accordance with an exemplary embodiment of the invention comprises FLASH memory and a controller. The FLASH memory provides data-storage space and is recorded with mapping information between logical and physical addresses. The mapping information is shown by a group table and a plurality of logical-to-physical address mapping tables corresponding to different groups. Each entry in the group table corresponds to one group and points to the logical-to-physical address mapping table corresponding thereto. The logical-to-physical address mapping tables show how host addresses are mapped to the data-storage space. The controller executes firmware to allocate the data-storage space to store data issued from a host, and the mapping information between logical and physical addresses are recorded in the FLASH memory by the controller.

A FLASH memory control method in accordance with an exemplary embodiment of the invention comprises the following steps: allocating the FLASH memory of a data-storage device to provide data-storage space for storing data issued from a host; and recording in the FLASH memory the mapping information between logical and physical addresses. The mapping information is shown by a group table and a plurality of logical-to-physical address mapping tables corresponding to different groups. Each entry in the group table corresponds to one group and points to the logical-to-physical address mapping table corresponding thereto. The logical-to-physical address mapping tables show how host addresses are mapped to the data-storage space.

A data-storage device in accordance with another exemplary embodiment of the invention comprises FLASH memory and a controller. The FLASH memory provides data-storage space and is recorded with a valid page count table, an invalid block record, and mapping information between logical and physical addresses. The controller allocates the data-storage space to store data issued from a host, and establishes and maintains the valid page count table, the invalid block record, and the mapping information between logical and physical addresses in the FLASH memory to manage the data-storage space. Note that the controller updates the mapping information between logical and physical addresses after updating the valid page count table. Further, the invalid block record is maintained by the controller based on the valid page count table.

A FLASH memory control method in accordance with another exemplary embodiment of the invention comprises the following steps: allocating FLASH memory to provide data-storage space to store data issued from a host; establishing and maintaining a valid page count table, an invalid block record, and mapping information between logical and physical addresses in the FLASH memory, wherein the mapping information between logical and physical addresses is updated after the valid page count table has been updated, and the invalid block record is maintained based on the valid page count table; and, managing the data-storage space based on the valid page count table, the invalid block record, and the mapping information between the physical and logical addresses.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
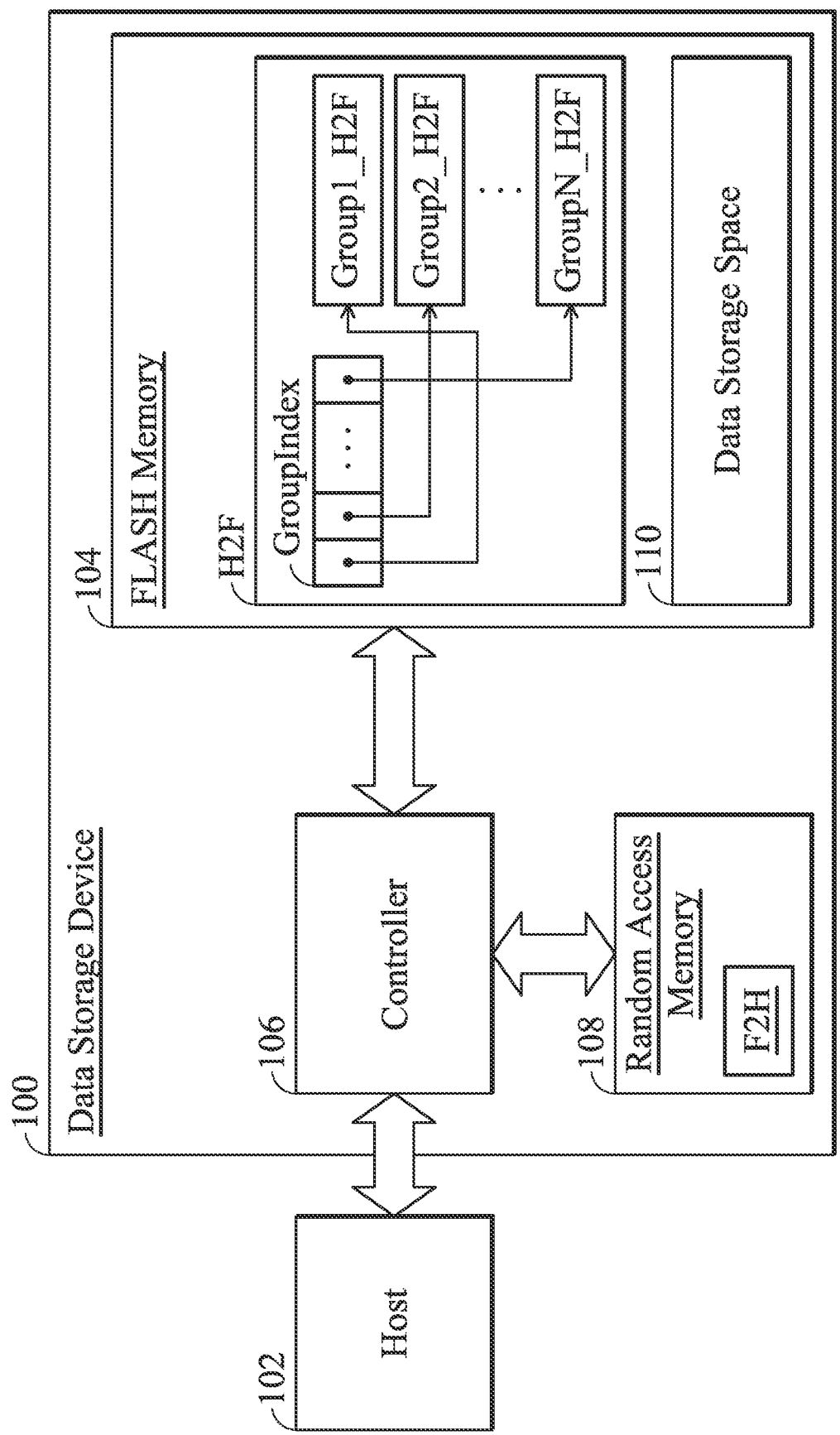
FIG. 1 depicts a data-storage device 100 in accordance with an exemplary embodiment of the invention.

FIG. 1 depicts a data-storage device 100, which can be controlled by a host 102.

The data-storage device 100 comprises FLASH memory 104 (e.g. a NAND FLASH), a controller 106, and a random-access memory 108. The FLASH memory 104 provides data-storage space 100 and is recorded with a valid page count table ValidPageCnt, logical-to-physical address mapping information H2F, an invalid block record InvalidBLKRecord, an event record EventRecord, and power-restoration information SafeLink. The controller 106 executes firmware (e.g., by executing codes loaded in a read-only memory of the controller 106) to allocate the data-storage space 110 to store data issued from the host 102, and to build and maintain the valid page count table ValidPageCnt, the logical-to-physical address mapping information H2F, the invalid block record InvalidBLKRecord, the event record EventRecord, and the power-restoration information SafeLink in the FLASH memory 104, for management of the data-storage space 110. Furthermore, under the control of the controller 106 that is executing the firmware, a physical-to-logical address mapping table F2H may be recorded in the random-access memory 108 as a reference when building and maintaining the logical-to-physical address mapping information H2F in the FLASH memory 104. The random-access memory 108 may further be stored with RunTimeLink and SafeLinkRam. RunTimeLink is a run-time record of management tables, wherein the management tables include the valid page count table ValidPageCnt, the logical-to-physical address mapping information H2F, and the invalid block record InvalidBLKRecord, and, in some exemplary embodiments, just the dependency between the different management tables is real-time recorded as RunTimeLink. SafeLinkRam is a temporary backup of the management tables SafeLinkRam. Every round of updating the valid page count table ValidPageCnt, the logical-to-physical address mapping information H2F and the invalid block record InvalidBLKRecord may be followed by updating the temporary backup (SafeLinkRam) of the management tables by the run-time record (RunTimeLink) of the management tables. The power-restoration information SafeLink in the FLASH memory 104 is updated in accordance with the content of the temporary backup SafeLinkRam. The memory allocation events occurring before the next backup round may be recorded as the event record EventRecord, to record information not yet backed up in the power-restoration information SafeLink.

The logical-to-physical address mapping information H2F may include a group table GroupIndex and a plurality of logical-to-physical address mapping tables Group1_H2F, Group2_H2F . . . GroupN_H2F corresponding to different groups.

In the group table GroupIndex, each entry corresponds to one group and points to the logical-to-physical address mapping tables corresponding to the one group. As shown, a first entry in the group table GroupIndex corresponds to a first group and points to a logical-to-physical address mapping table Group1_H2F. A second entry in the group table GroupIndex corresponds to a second group and points to a logical-to-physical address mapping table Group2_H2F. In the same manner, an Nth entry in the group table GroupIndex corresponds to an Nth group and points to a logical-to-physical address mapping table GroupN_H2F.

According to the logical-to-physical address mapping tables Group1_H2F, Group2_H2F . . . GroupN_H2F, host addresses issued from the host 102 are group classified and then mapped to the data-storage space 110 accordingly. For example, the logical-to-physical address mapping table Group1_H2F shows how the host addresses belonging to a first group (e.g., within a first host address range) are mapped to the data-storage space 110. The logical-to-physical address mapping table Group2_H2F shows how the host addresses belonging to a second group (e.g., within a second host address range) are mapped to the data-storage space 110. In the similar manner, the logical-to-physical address mapping table GroupN_H2F shows how the host addresses belonging to an $N_{th}$ group (e.g., within an $N_{th}$ host address range) are mapped to the data-storage space 110.

Figure 2A:
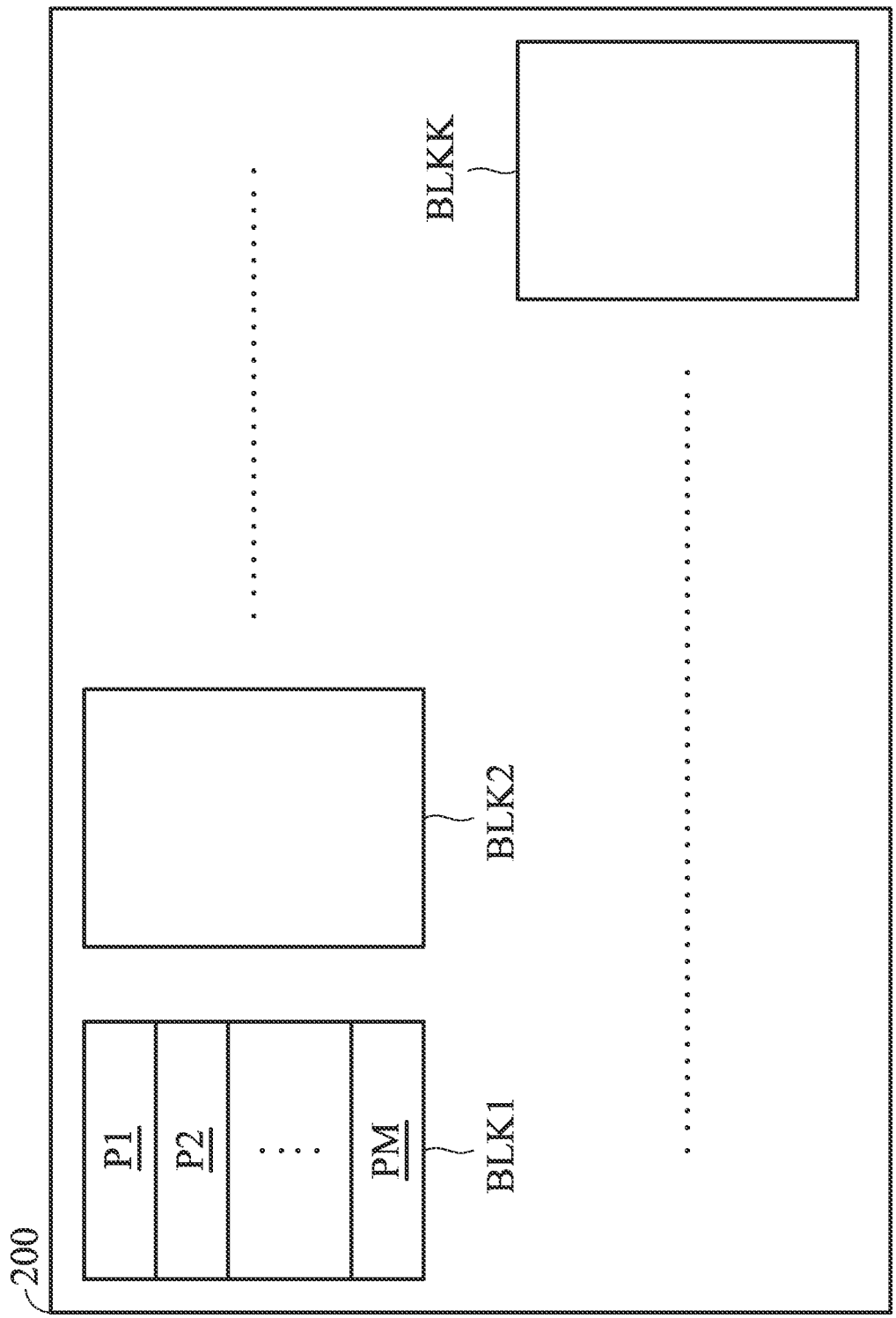
FIG. 2A depicts a data structure of FLASH memory.
Figure 2B:
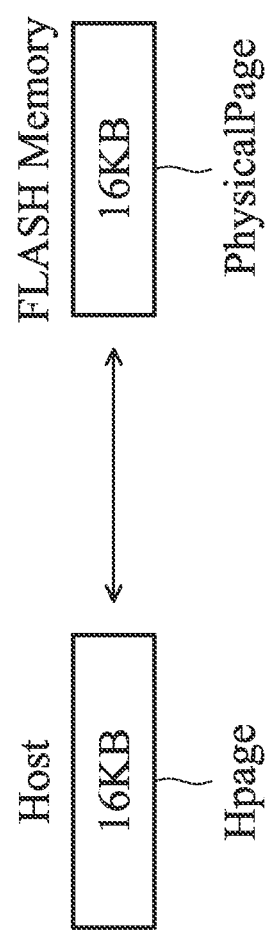
FIG. 2B shows the mapping information between a host page Hpage issued by a host and a physical page PhysicalPage of the FLASH memory.

FIG. 2A depicts a data structure of a FLASH memory. The FLASH memory 200 comprises a plurality of blocks BLK1, BLK2 . . . BLKK. Each block includes a plurality of pages. For example, block BLK1 includes pages P1, P2 . . . PM. In FIG. 2B, a mapping between a host page Hpage issued by a host and a physical page PhysicalPage (referring to the "page" shown in FIG. 2A) of FLASH memory is shown. The size of one host page Hpage may be equal to the size of one physical page PhysicalPage—for example, both are 16 KB. Each host page Hpage corresponds to a physical page PhysicalPage allocated in the FLASH memory.

In accordance with FIG. 2A and FIG. 2B, each entry in the logical-to-physical address mapping table Group1_H2F, Group2_H2F . . . or GroupN_H2F corresponds to one host page, and may be stored with a block tag and a page tag showing what block and what page of the data-storage space 110 is allocated to the host page. Further, each entry in the group table GroupIndex, corresponding to one group, may also use a block tag and a page tag to indicate the block location and the page location of the logical-to-physical address mapping table of the one group. The physical-to-logical address mapping table F2H stored in the random-access memory 108 may be updated in a timely manner to show the mapping from physical pages of the FLASH memory to the host pages issued by the host, such that the host page corresponding to each physical page is recorded.

Figure 3:
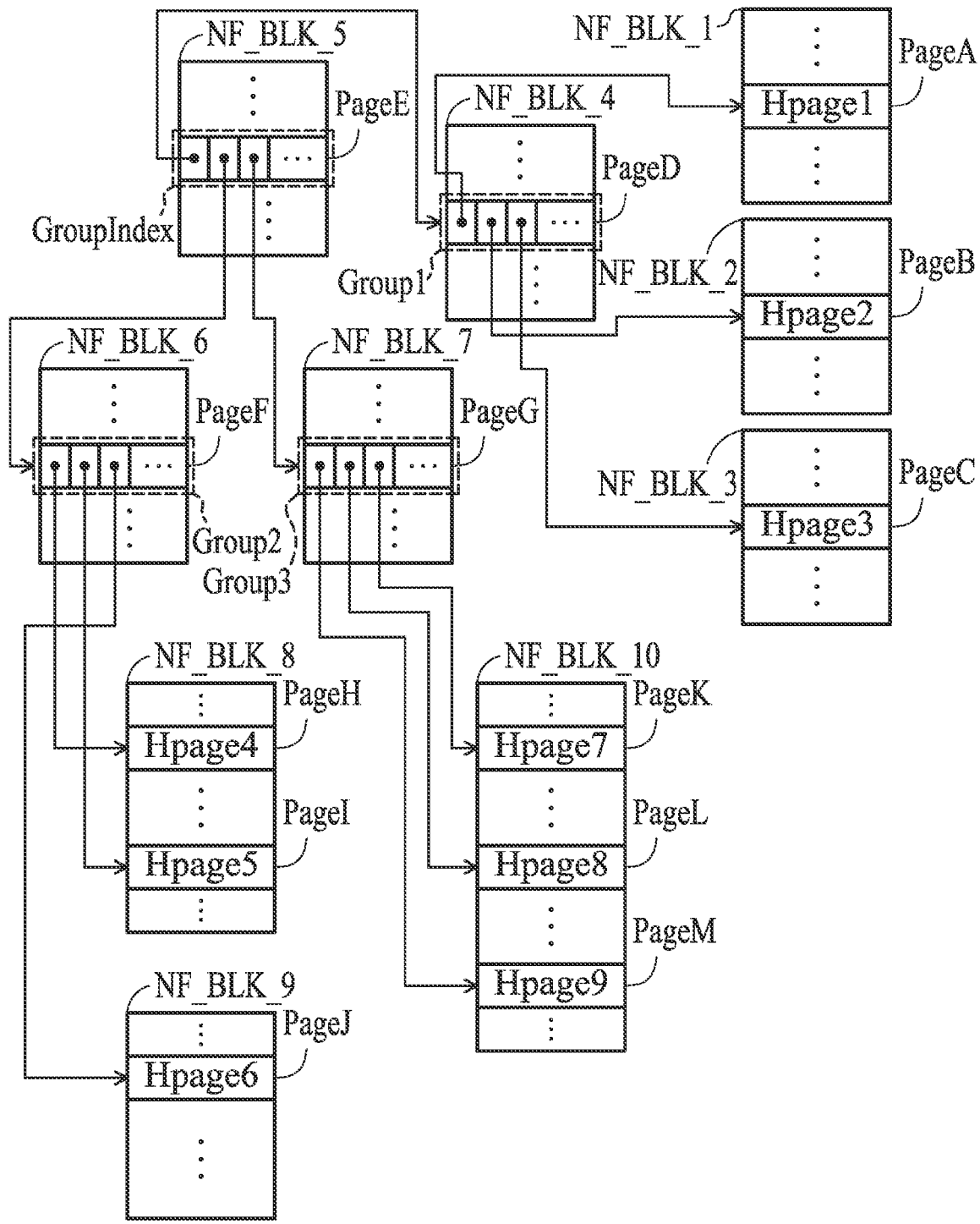
FIG. 3 illustrates an example showing how the disclosed group table and logical-to-physical address mapping tables work.

In accordance with FIG. 2A and FIG. 2B, FIG. 3 illustrates an example showing how a group table and a plurality of logical-to-physical address mapping tables work.

As shown, host pages Hpage1, Hpage2, and Hpage3 (issued by the host) are respectively stored in FLASH memory in PageA of block NF_BLK_1, PageB of block NF_BLK_2, and PageC of block NF_BLK_3. The host pages Hpage1, Hpage2, and Hpage3 are grouped into a first group, and the logical-to-physical address mapping table Group1 for the first group is stored in PageD of block NF_BLK_4. The table Group1 has a first entry pointing to PageA of block NF_BLK1 to indicate the physical page allocated to the host page Hpage1, a second entry pointing to PageB of block NF_BLKq to indicate the physical page allocated to the host page Hpage2, and a third entry pointing to PageC of block NF_BLK3 to indicate the physical page allocated to the host page Hpage3.

As shown, PageE of block NF_BLK_5 is allocated to store a group table GroupIndex. The first entry in the group table GroupIndex corresponds to the first group and thereby points to PageD of block NF_BLK_3 to indicate the logical-to-physical address mapping table Group1. The remaining entries of the group table GroupIndex may correspond to other groups. As shown, the second entry in the group table GroupIndex corresponds to a second group and points to PageF of block NF_BLK_6, indicating the logical-to-physical address mapping table Group2. The logical-to-physical address mapping Group2 provides several pointers pointing to the data storage locations of the host pages classified as the second group (as shown, pointing to pages PageH and PageI of block NF_BLK_8 for host pages Hpage4 and Hpage5, and further pointing to PageJ of block NF_BLK_9 for host page Hpage6). Further, the third entry in the group table GroupIndex corresponds to a third group and points to PageG of block NF_BLK_7, indicating the logical-to-physical address mapping Group3. The logical-to-physical address mapping Group3 provides several pointers pointing to the data storage locations of the host pages classified as the third group (as shown, pointing to pages PageK, PageL, and PageM of block NF_BLK_10 for host pages Hpage7, Hpage8, and Hpage9). Note that, according to the disclosed management rule, host pages of the same group may be distributed over several blocks (referring to the three host pages Hpage1, Hpage2, and Hpage3 distributed over the three different blocks NF_BLK_1, NF_BLK_2, and NF_BLK_3, or the three host pages Hpage4, Hpage5, and Hpage6 distributed over the two different blocks NF_BLK_8 and NF_BLK_9). Further, in some examples, host pages of the same group may be gathered in the same block (e.g., the three host pages Hpage7, Hpage8, and Hpage9 are all stored within block NF_BLK_10).

Referring to the exemplary embodiment of FIG. 3, when the host requests to read the host page Hpage1, the controller of the data-storage device may analyze the host page Hpage1 and thereby discover that the host page Hpage1 belongs to the first group. The controller may look up the group table GroupIndex for the entry corresponding to the first group and, accordingly, the pointer stored in the entry is obtained which points to logical-to-physical address mapping table Group1. The controller further looks up the logical-to-physical address mapping table Group1 for the entry corresponding to the host page Hpage1 and thereby determines that the host page Hpage1 is stored in PageA of block NF_BLK_1. In this manner, the read operation of the host page Hpage1 is achieved. In the disclosure, the logical-to-physical address mapping is built by a hierarchical structure consisting of at least two levels.

Figure 4:
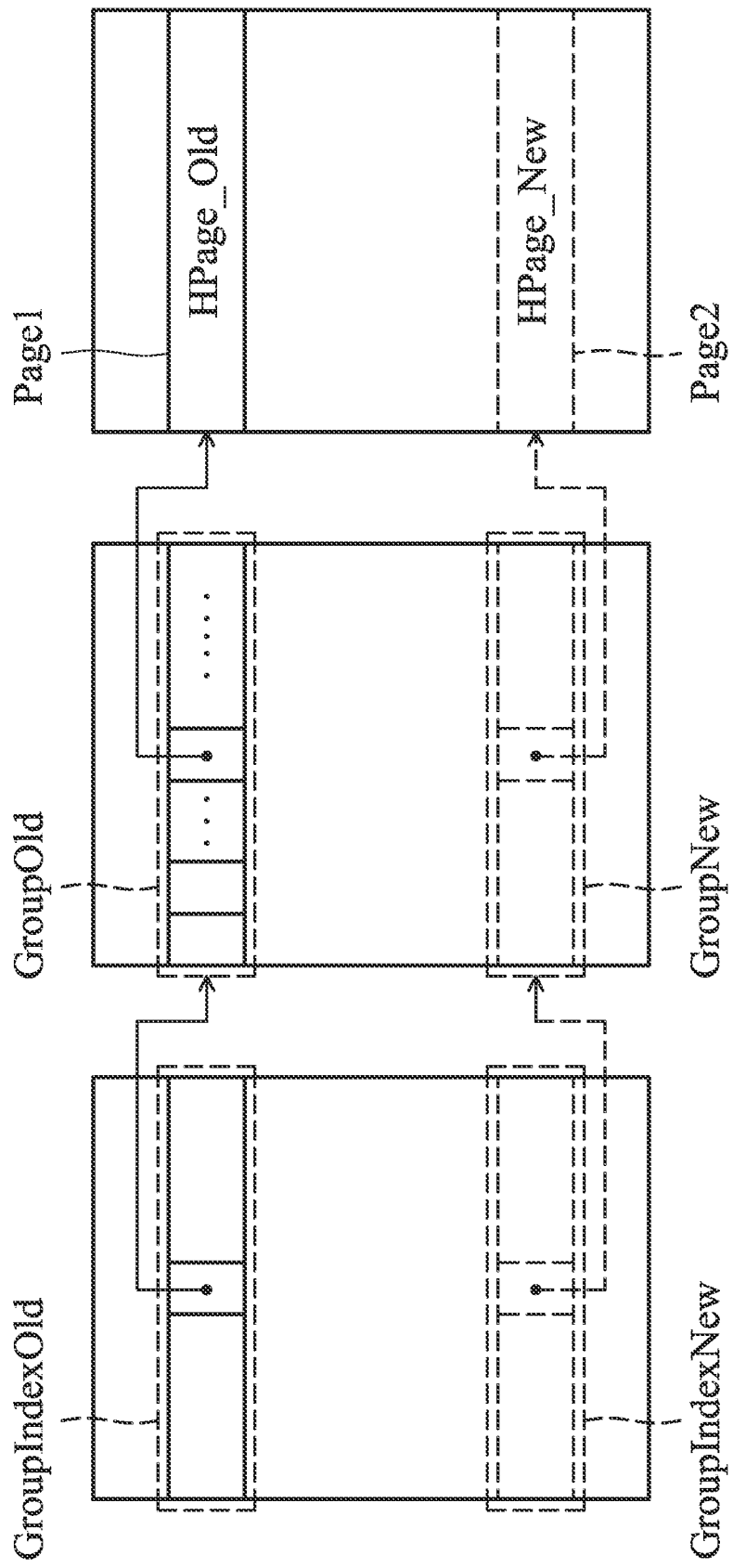
FIG. 4 shows an update technique for H2F.

The logical-to-physical address mapping information H2F facilitates management of large-capacity FLASH memory. FIG. 4 shows an update technique for the logical-to-physical address mapping information H2F.

Referring to FIG. 4, old data Hpage_Old of a target host page is stored in an old page Page1, which is indicated by the pointer stored in an entry in a logical-to-physical address mapping table GroupOld. The logical-to-physical address mapping table GroupOld is indicated by a pointer stored in an entry in a group table GroupIndexOld.

When the target host page is updated, a new page Page2 is allocated to store the new data HPage_New of the target host page, and the old page Page1 is marked invalid. Further, a new page is allocated to store the updated logical-to-physical address mapping table GroupNew, and the page storing the old logical-to-physical address mapping table GroupOld is marked invalid. As shown, one entry in the new logical-to-physical address mapping table GroupNew points to the new page Page2 to indicate the new data HPage_New. Further, a new page is allocated to store the updated group table GroupIndexNew, and the page storing the old group table GroupIndexOld is marked invalid. As shown, one entry in the new group table GroupIndexNew points to the new logical-to-physical address mapping table GroupNew. In this manner, the logical-to-physical address mapping information H2F is updated by the newly allocated two pages (allocated to store the updated group table GroupIndexNew and the updated logical-to-physical address mapping table Group_New). The mapping information between the target host page and the physical space is easily updated. The update process is simple and easy, suitable for large-capacity FLASH memory.

In one exemplary embodiment, when the page Page2 is allocated to the target host page, the mapping information between the target host page and the newly allocated page Page2 may first be stored by the physical-to-logical address mapping table F2H in the random-access memory (108 of FIG. 1) as a reference when storing the new data HPage_New into the FLASH memory, or as a reference for maintaining the logical-to-physical address mapping information H2F.

In an exemplary embodiment, the old page data HPage_Old corresponding to the target host page and stored in the old page Page1 is copied to the random-access memory 108 first to be updated to the new page data HPage_New in the ransom access memory 108 and then stored to the newly allocated page Page2 according to the physical-to-logical address mapping table F2H. Similarly, the logical-to-physical address mapping table GroupOld is copied to the random-access memory 108 to be updated to GroupNew in the random-access memory 108 and then written back to the FLASH memory 108. Similarly, the group table GroupIndexOld is copied to the random-access memory 108 to be updated to GroupIndexNew in the random-access memory 108 and then written back to the FLASH memory 108.

Figure 5:
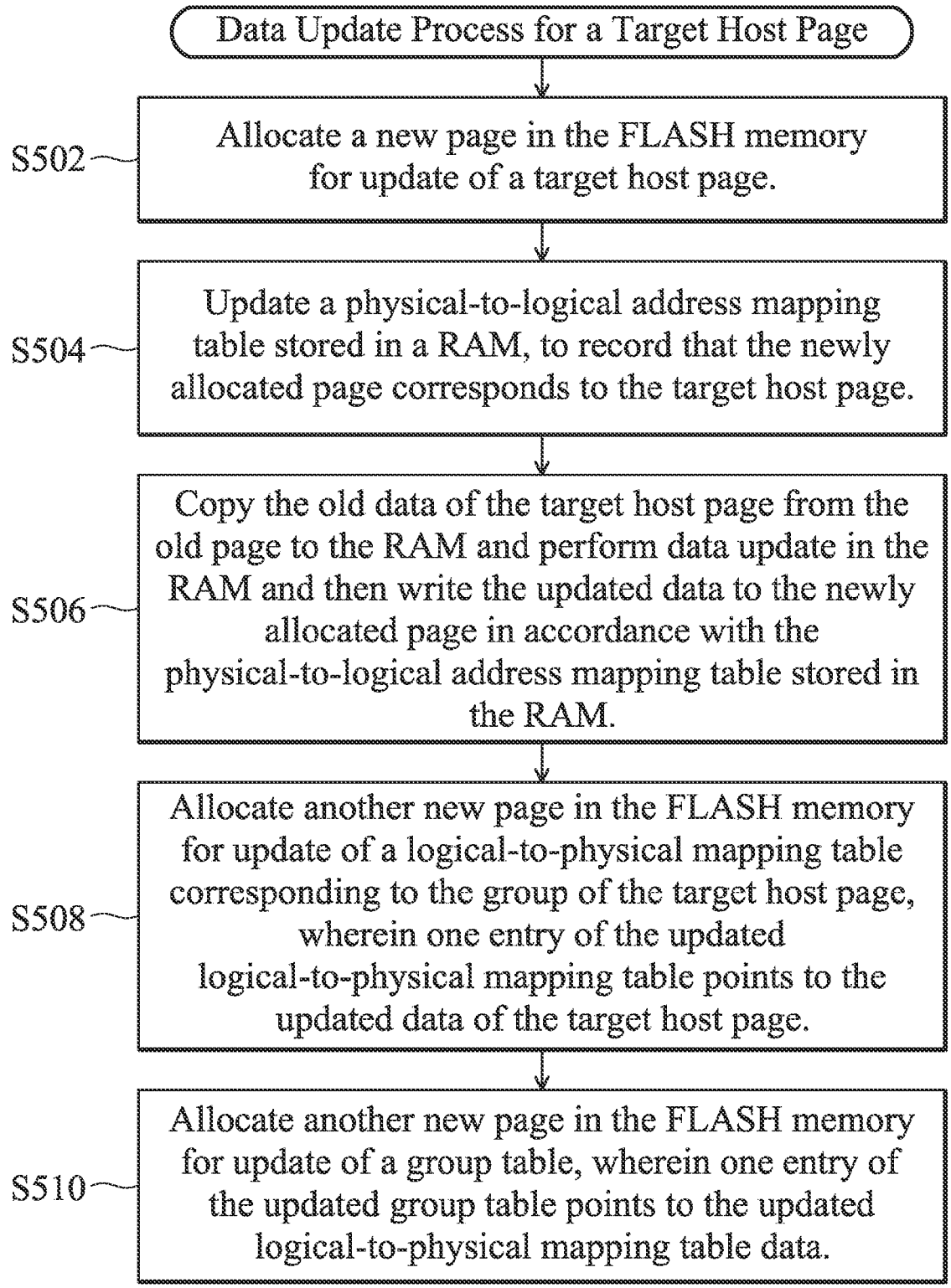
FIG. 5 is a flowchart depicting a data update process for a target host page.

FIG. 5 is a flowchart depicting a data update process for a target host page. In step S502, a new page (Page2 of FIG. 4) of the FLASH memory is allocated to the target host page for data update. In step S504, the physical-to-logical address mapping table F2H stored in the random-access memory 108 is updated and thereby the mapping from the newly allocated page Page2 to the target host page is recorded. In step S506, the old data Hpage_Old of the target host page stored in the old page (Page1 of FIG. 4) is copied to the random-access memory 108 and updated to the new data HPage_New in the random-access memory 108 and then written back to the FLASH memory in Page2. In step S508, another new page (GroupNew of FIG. 4) is allocated in the FLASH memory for updating the logical-to-physical address mapping table corresponding to the group of the target host page. One entry in GroupNew points to the page Page2. In step S510, another new page (GroupIndexNew of FIG. 4) is allocated in the FLASH memory for update of the group table. One entry in GroupIndexNew points to the updated logical-to-physical address mapping table GroupNew.

In step S508, the old logical-to-physical address mapping table (GroupOld of FIG. 4) may first be copied to the random-access memory 108 to be updated in the random-access memory 108 and then written back to the FLASH memory in the newly allocated page GroupNew. In step S510, the old group table (GroupIndexOld of FIG. 4) may first be copied to the random-access memory 108 to be updated in the random-access memory 108 and then written back to the FLASH memory in the newly allocated page GroupIndexNew.

The maintenance of the logical-to-physical address mapping information H2F may be performed according to the firmware executed by the controller 106.

The other management tables (e.g., ValidPageCnt, InvalidBLKRecord, EventRecord or SafeLink of FIG. 1) may be built and maintained as discussed below. In the following discussion, the logical-to-physical address mapping information H2F is not limited to a hierarchical structure. Any technique capable of showing the mapping between logical and physical addresses can be adopted for the record of the logical-to-physical address mapping information H2F discussed below. By a valid page count table ValidPageCnt, the number of valid pages of each block is shown. An invalid block record InvalidBLKRecord is maintained based on the valid page count table ValidPageCnt. For example, a block with zero valid pages may be labeled as an invalid block.

Figure 6:
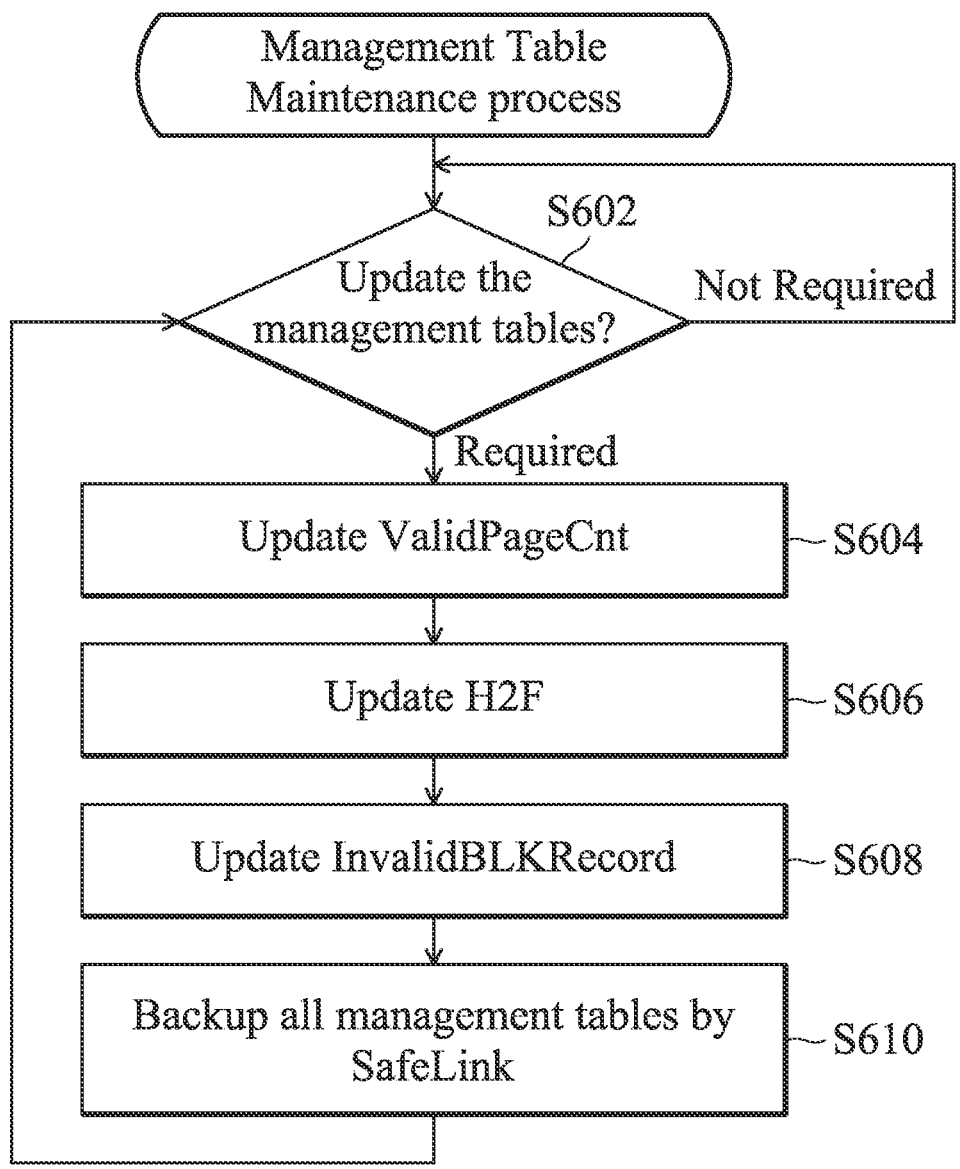
FIG. 6 is a flowchart depicting a process for table maintenance.

FIG. 6 is a flowchart depicting a process for table maintenance. In step S602, FLASH memory is monitored to determine whether update of the management tables is required. In an exemplary embodiment, the update of the management tables is requested when any block is filled full (no spare pages remained.) Note that the update of the management tables may be requested by other events. Furthermore, the memory data updates between every two management table update requests may be recorded by the event record EventRecord. When it is determined in step S602 that the management tables should be updated, step S604 may be performed. In step S604, the event record EventRecord is compared to the logical-to-physical address mapping information H2F and, accordingly, the valid page count table ValidPageCnt is updated. After the update of the valid page count table ValidPageCnt is completed, step S606 is performed to update the logical-to-physical address mapping information H2F based on the event record EventRecord. The update of the invalid block record InvalidBLKRecord is also provided after the update of the valid page count table ValidPageCnt is completed. As shown, the update of the invalid block record InvalidBLKRecord is performed by step S608. In step S610, the updated valid page count table ValidPageCnt, logical-to-physical address mapping information H2F and invalid block record InvalidBLKRecord are backed-up to the FLASH memory 104 as power-restoration information SafeLink (which may depend on a run-time record RunTimeLink and a temporary backup SafeLinkRam dynamically recorded in the random-access memory 108). In this manner, every round of the management table update is completed, restoration information is backed-up in the SafeLink, and memory data updates occur before the next backup by SafeLink is recorded in the event record EventRecord. No matter when an unexpected interruption occurs, the management of information about the data-storage space 110 is properly maintained.

Figure 7:
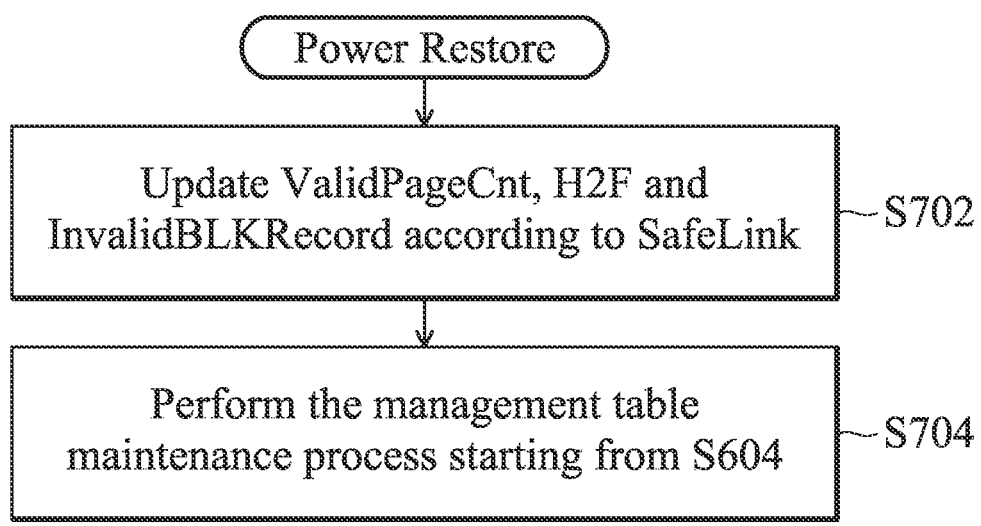
FIG. 7 is a flowchart depicting a power-restoration process in accordance with an exemplary embodiment of the invention.

FIG. 7 is a flowchart depicting a power-restoration process. In step S702, the backup information stored as the restoration information SafeLink may be used in a preliminary update of the valid page count table ValidPageCnt, the logical-to-physical address mapping information H2F, and the invalid block record InvalidBLKRecord. In S704, the steps starting from S604 of FIG. 6 are performed to further update the management tables. In step S604, the information not yet backed up as the power-restoration information SafeLink but recorded in the event record EventRecord is compared with the logical-to-physical address mapping information H2F to further update the valid page count table ValidPageCnt. In the subsequent step S606, the logical-to-physical address mapping information H2F is further updated according to the event record EventRecord. In this manner, an unexpected interruption does not affect the maintenance of the valid page count table ValidPageCnt, the logical-to-physical address mapping information H2F, and the invalid block record IvalidBLKRecord.

Figure 8:
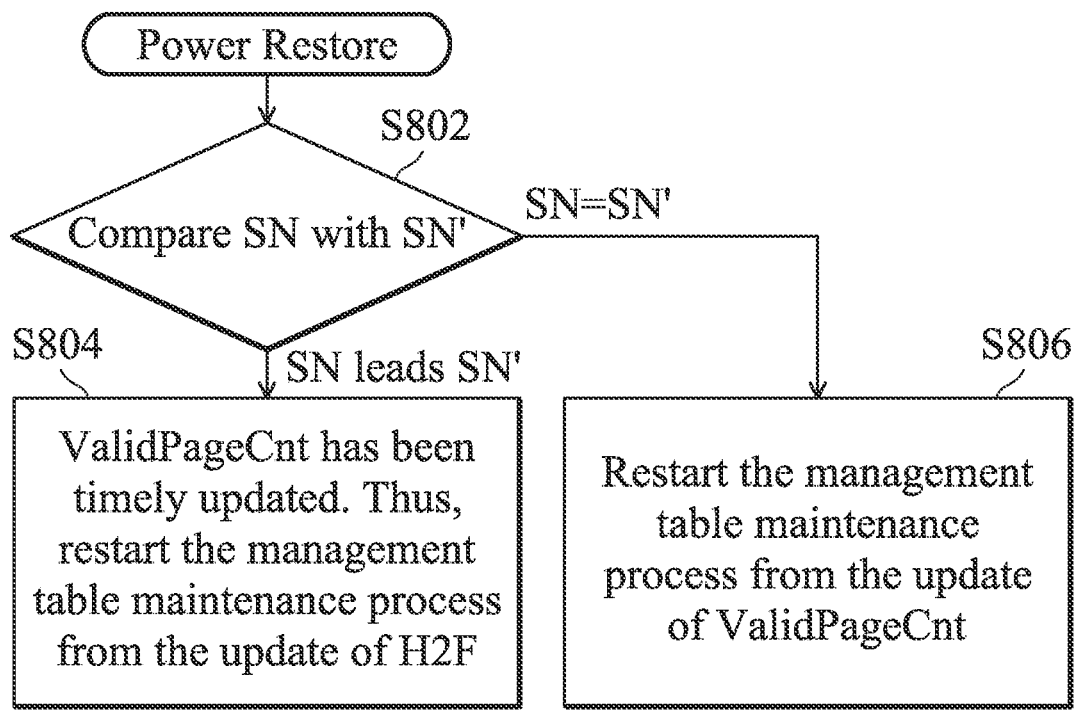
FIG. 8 is a flowchart depicting a power-restoration process in accordance with another exemplary embodiment of the invention.

In another exemplary embodiment, an unexpected interruption is detected by a serial number comparison technique, which updates a serial number SN after the update step S604 of the valid page count table ValidPageCnt is completed and updates another serial number SN' after the update step S608 of the invalid block record InvalidBLKRecord is completed, and bypasses the step S610 of FIG. 6. As shown in FIG. 1, the serial number SN may be recorded in a management space of the valid page count table ValidPageCnt, and the serial number SN' may be recorded in a management space of the invalid block record InvalidBLKRecord. Thus, the serial number SN shows the number of updates of the valid page count table ValidPageCnt, and the serial number SN' shows the number of updates of the invalid block record InvalidBLKRecord. FIG. 8 shows a power-restoration process. In step S802, the serial number SN is compared with the serial number SN'. When the serial number SN is greater than the serial number SN', step S804 is performed. It is determined that the valid page count table ValidPageCnt has been updated in a timely manner such that the management table maintenance process is restarted from updating the logical-to-physical address mapping information H2F. The update of H2F may be performed based on the content of the event record EventRecord. When the serial number SN equals to the serial number SN', step S806 is performed to restart the management table maintenance process from the update of the valid page count table ValidPageCnt. The update of the valid page count table ValoidPageCnt may be performed by comparing the event record EventRecord with the logical-to-physical address mapping information H2F. In such exemplary embodiments, the power-restoration table SafeLink backup is not necessary.

The procedures of FIG. 6 to FIG. 8 may be implemented by firmware technique executed by the controller 106.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data-storage device, comprising:
   a FLASH memory, providing data-storage space and recorded with logical-to-physical address mapping information, wherein:
   the logical-to-physical address mapping information includes a group table and a plurality of logical-to-physical address mapping tables corresponding to different groups;
   each entry in the group table corresponds to one group and points to one logical-to-physical address mapping table corresponding thereto; and
   the logical-to-physical address mapping tables show how host addresses are mapped to the data-storage space;
   a controller, executing firmware to allocate the data-storage space to store data issued from a host and to maintain the logical-to-physical address mapping information in the FLASH memory; wherein
   when allocating a first new page in the FLASH memory to update a target host page, the controller further corrects the physical-to-logical address mapping table in a random-access memory to record that the first new page maps to the target host page, copies an original page of the target host page from the FLASH memory to the random-access memory to be updated in the random-access memory and then write to the first new page of the FLASH memory in accordance with the physical-to-logical address mapping table provided by the random-access memory, allocates a second new page in the FLASH memory for update of the logical-to-physical address mapping table corresponding to the target host page to point to the first new page by one entry therein, and allocates a third new page in the FLASH memory for update of the group table to point to the second new page by one entry therein.

2. The data-storage device as claimed in claim 1, wherein the FLASH memory comprises a plurality of blocks and each of the blocks comprises a plurality of pages.

3. The data-storage device as claimed in claim 2, wherein each entry in the logical-to-physical address mapping table corresponds to a host page and is recorded with a block tag and a page tag indicating where the host page is stored in the data-storage space.

4. The data-storage device as claimed in claim 3, wherein each entry in the group table is recorded with a block tag and a page tag indicating where the logical-to-physical address mapping table corresponding thereto is stored in the data-storage space.

5. The data-storage device as claimed in claim 4, wherein the random-access memory, records a physical-to-logical address mapping table according to the controller executing the firmware, to timely update a mapping showing how the pages of the FLASH memory are mapped to host pages.

6. A FLASH memory control method, comprising:
allocating data-storage space in a FLASH memory, to store data issued from a host; and
maintaining logical-to-physical address mapping information in the FLASH memory, wherein:
the logical-to-physical address mapping information includes a group table and a plurality of logical-to-physical address mapping tables corresponding to different groups;
each entry in the group table corresponds to one group and points to one logical-to-physical address mapping table corresponding thereto;
the logical-to-physical address mapping tables show how host addresses are mapped to the data-storage space;
allocating a first new page in the FLASH memory to update a target host page;
correcting the physical-to-logical address mapping table in the random-access memory to record that the first new page maps to the target host page;
copying an original page of the target host page from the FLASH memory to the random-access memory to be updated in the random-access memory and then write to the first new page of the FLASH memory in accordance with the physical-to-logical address mapping table provided by the random-access memory;
allocating a second new page in the FLASH memory for update of the logical-to-physical address mapping table corresponding to the target host page to point to the first new page by one entry therein; and
allocating a third new page in the FLASH memory for update of the group table to point to the second new page by one entry therein.

7. The FLASH memory control method as claimed in claim 6, wherein the FLASH memory comprises a plurality of blocks and each of the blocks comprises a plurality of pages.

8. The FLASH memory control method as claimed in claim 7, wherein each entry in the logical-to-physical address mapping table corresponds to a host page and is recorded with a block tag and a page tag indicating where the host page is stored in the data-storage space.

9. The FLASH memory control method as claimed in claim 8, wherein each entry in the group table is recorded with a block tag and a page tag indicating where the logical-to-physical address mapping table corresponding thereto is stored in the data-storage space.

10. The FLASH memory control method as claimed in claim 9, further comprising:
recording a physical-to-logical address mapping table in the random-access memory to timely update a mapping showing how the pages of the FLASH memory are mapped to host pages.

* * * * *